US009248596B2

(12) United States Patent
Yamaguchi

(10) Patent No.: US 9,248,596 B2
(45) Date of Patent: Feb. 2, 2016

(54) INJECTION APPARATUS

(71) Applicant: Kazuyuki Yamaguchi, Kariya (JP)

(72) Inventor: Kazuyuki Yamaguchi, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 135 days.

(21) Appl. No.: 14/351,615

(22) PCT Filed: Oct. 2, 2012

(86) PCT No.: PCT/JP2012/075525
§ 371 (c)(1),
(2) Date: Apr. 14, 2014

(87) PCT Pub. No.: WO2013/058103
PCT Pub. Date: Apr. 25, 2013

(65) Prior Publication Data
US 2014/0234471 A1     Aug. 21, 2014

(30) Foreign Application Priority Data

Oct. 19, 2011 (JP) ................................. 2011-230015

(51) Int. Cl.
*B22D 17/32* (2006.01)
*B29C 45/53* (2006.01)
*B29C 45/77* (2006.01)

(52) U.S. Cl.
CPC ................ *B29C 45/53* (2013.01); *B22D 17/32* (2013.01); *B29C 45/531* (2013.01); *B29C 45/77* (2013.01)

(58) Field of Classification Search
CPC .............................. B22D 17/32; B29C 45/531
USPC ..................................................... 164/312, 113
See application file for complete search history.

(56) References Cited

U.S. PATENT DOCUMENTS

| 2,711,157 A | 6/1955 | Halward |
| 3,834,276 A | 9/1974 | Gournelle |

(Continued)

FOREIGN PATENT DOCUMENTS

| JP | 2-142664 A | 5/1990 |
| JP | 3-287336 A | 12/1991 |

(Continued)

OTHER PUBLICATIONS

International Preliminary Report on Patentability, dated Apr. 22, 2014, issued by the International Searching Authority, in counterpart Application No. PCT/JP2012/075525.

(Continued)

*Primary Examiner* — Kevin P Kerns
(74) *Attorney, Agent, or Firm* — Sughrue Mion, PLLC

(57) ABSTRACT

The injection apparatus is provided with a high speed step cylinder, a pressure accumulation part and a coupling mechanism. The high speed step cylinder has a rod and an operating chamber. The coupling mechanism is capable of switching between a coupled state in which the movement of the rod is restricted, and a non-coupled state in which the coupled state is released so as to enable the rod to move due to the operating pressure. The coupling mechanism includes a first coupling member, a second coupling member and a drive source. The coupling mechanism is kept in the coupled state in which the second coupling member is rotated to less than 90°. When the second coupling member is forced to rotate in the coupled state, the first coupling member rotates such that a first contact surface is in contact with a second contact surface.

5 Claims, 7 Drawing Sheets

(56) References Cited

U.S. PATENT DOCUMENTS

| | | | |
|---|---|---|---|
| 3,890,824 A | 6/1975 | Camion et al. | |
| 5,887,641 A | 3/1999 | Iwamoto et al. | |
| 9,108,353 B2 * | 8/2015 | Yamaguchi et al. | ... B22D 17/32 |
| 2009/0242161 A1 | 10/2009 | Uchida et al. | |
| 2010/0000699 A1 | 1/2010 | Uchida et al. | |

FOREIGN PATENT DOCUMENTS

| | | |
|---|---|---|
| JP | 4-203510 A | 7/1992 |
| JP | 6-198502 A | 7/1994 |
| JP | 9-52164 A | 2/1997 |
| JP | 2004-74533 A | 3/2004 |
| JP | 2007210000 A | 8/2007 |
| JP | 2007283387 A | 11/2007 |
| JP | 2008-105055 A | 5/2008 |
| JP | 2008155280 A | 7/2008 |
| JP | 2011131225 A | 7/2011 |
| JP | 4790869 B1 | 10/2011 |
| WO | 2008/035805 A1 | 3/2008 |

OTHER PUBLICATIONS

Communication dated May 28, 2015, issued by the European Patent Office in counterpart Application No. 12841627.8.

* cited by examiner

INJECTION APPARATUS

CROSS REFERENCE TO RELATED APPLICATIONS

This application is a National Stage of International Application No. PCT/JP2012/075525 filed Oct. 2, 2012, claiming priority based on Japanese Patent Application No. 2011-230015 filed Oct. 19, 2011, the contents of all of which are incorporated herein by reference in their entirety.

TECHNICAL FIELD

The present invention relates to an injection apparatus that performs a low speed operation, a high speed operation, and a pressurizing operation to inject and fill molding material into a mold.

BACKGROUND ART

Generally, an injection apparatus for a molding machine moves an injection plunger forward in a sleeve with an injection cylinder and forces molding material (e.g., molten material) out of the sleeve into a cavity formed between molds (mold unit) to inject and fill the molding material into the cavity. The injecting and filling operation includes a low speed operation, a high speed operation, and a pressurizing operation.

The injection apparatus performs the high speed operation by, for example, supplying hydraulic oil, which is accumulated in an accumulator, to the injection cylinder, and moving a rod (piston) of the injection cylinder at a high speed. Generally, in the high speed operation, a control valve controls an open degree of an oil passage connected to the accumulator to restrict movement of the rod and control the movement speed of the rod.

In the high speed operation, it is desirable that the injection time be further shortened. The response in the movement of the rod needs to be increased to shorten the injection time. To improve the response in the movement of the rod, the hydraulic pressure and the flow rate of the hydraulic oil acting on the piston need to be increased. The control valve, however, gradually opens the oil passage, and the hydraulic pressure acting on the piston is gradually increased. Thus, there is a limit to increasing the response in the movement of the rod.

The rod may be mechanically coupled to restrict movement of the rod when the hydraulic pressure of the hydraulic oil is acting on the piston. Under this situation, the mechanical coupling may be released to move the piston with the maximum hydraulic pressure. To implement such a structure, a connection mechanism that may be mechanically connected to and disconnected from the rod is required.

Patent document 1 describes a hydraulic clamp as an example of such a connection mechanism. As shown in FIG. 8, in the hydraulic clamp 80 of patent document 1, a hydraulic cylinder 81 includes a lower portion that accommodates a piston 82, which is movable in the vertical direction. A clamp hydraulic oil chamber 83 is defined at the lower side of the piston 82. In the hydraulic cylinder 81, an oil supply/discharge port 81a is formed below the clamp hydraulic oil chamber 83. Hydraulic oil from a hydraulic source 84 is supplied to and discharged from the oil supply/discharge port 81a through an electromagnetic supply/discharge valve 85 and a supply/discharge oil passage 86.

In the hydraulic cylinder 81, a clamp tool 87, which is formed by combining a plurality of clamp jaws 87a, is set on the upper surface of the piston 82. A retraction means (not shown) urges the clamp jaws 87a in directions enlarging the diameter. A tubular advancing inclination cam 88 is arranged at the upper side of the clamp tool 87. In an upper portion of the hydraulic cylinder 81, a pneumatic cylinder 90 is arranged above the clamp tool 87, and a pneumatic piston 91 of the pneumatic cylinder 90 surrounds the clamp tool 87.

A pneumatic operation chamber 92 is formed in the lower side of the pneumatic piston 91. A piston recovery spring 93 is arranged inside the pneumatic piston 91. The advancing inclination cam 88 is inserted into a piston rod 91a extending from the pneumatic piston 91 toward the clamp tool 87. An unclamp piston 99, movable in the vertical direction, is accommodated in the pneumatic operation chamber 92.

The hydraulic cylinder 81 includes a compressed air supply/discharge port 81b, which is in communication with the pneumatic operation chamber 92. Compressed air from a pneumatic source 94 is supplied to and discharged from the compressed air supply/discharge port 81b through an electromagnetic pneumatic supply/discharge valve 95 and a supply/discharge air passage 96.

The hydraulic clamp 80 sets the hydraulic cylinder 81 onto the clamp rod 97 from above and clamps the clamp rod 97 clamped with the clamp tool 87 to mechanically connect the hydraulic clamp 80 and the clamp rod 97. The clamp rod 97 includes a distal end defining a passive portion 97a that engages with the clamp tool 87.

To clamp the clamp rod 97 with the hydraulic clamp 80, the electromagnetic pneumatic supply/discharge valve 95 is controlled to discharge compressed air out of the pneumatic operation chamber 92. This moves the pneumatic piston 91 toward the advancing inclination cam 88 with the spring force of the piston recovery spring 93. This moves the advancing inclination cam 88 downward and reduces the diameter of the clamp tool 87 so that the clamp tool 87 is arranged facing the lower surface in the passive portion 97a of the clamp rod 97. When the hydraulic oil from the hydraulic source 84 is supplied to the oil supply/discharge port 81a, the clamp tool 87 moves upward as the piston 82 moves upward, and the distal end of the clamp tool 87 is pushed against the lower surface of the passive portion 97a. As a result, the clamp rod 97 is clamped by the hydraulic clamp 80, and the clamp rod 97 and the hydraulic clamp 80 are mechanically connected.

When the pressure oil is discharged from the oil supply/discharge port 81a and the compressed air is supplied to the pneumatic operation chamber 92, the piston 82 is moved downward by the unclamp piston 99. Further, the pneumatic piston 91 moves upward. Thus, the clamp tool 87 unclamps the clamp rod 97. That is, the clamp rod 97 and the hydraulic clamp 80 are mechanically disconnected.

The use of the hydraulic clamp 80 in the injection cylinder allows for the rod to be mechanically connected to and disconnected from the hydraulic clamp 80. This improves the response for moving the rod of the injection cylinder and allows for an increase in the injection speed during the high speed operation.

PRIOR ART DOCUMENT

Patent Document

Patent Document 1: Japanese Laid-Open Patent Publication No. 3-287336

SUMMARY OF THE INVENTION

However, a hydraulic circuit and a pneumatic circuit are both needed to clamp the clamp rod 97 with the clamp tool 87 in the hydraulic clamp 80 disclosed in patent document 1. Thus, even though the use of the hydraulic clamp 80 allows for an increase in the injection speed during the high speed operation, the structure of the connection mechanism is extremely complicated. This increases the manufacturing cost of the injection apparatus.

It is an object of the present invention to provide an injection apparatus having a simple and inexpensive structure that allows for an increase in the injection speed during a high speed operation.

To achieve the above object, one aspect of the present invention is an injection apparatus that performs a low speed operation, a high speed operation, and a pressurizing operation to inject and fill a molding material into a mold. The injection apparatus includes a high speed operation cylinder, an accumulating unit, and a connection mechanism. The high speed operation cylinder is operated during the high speed operation and includes a rod and an operation chamber. The accumulating unit is connected to the operation chamber to supply operational pressure to the operation chamber and move the rod. The connection mechanism is switchable between a connected state, in which the connection mechanism restricts movement of the rod caused by the operational pressure of the accumulating unit, and a disconnected state, in which the connection mechanism cancels the connected state so that the rod is movable by the operational pressure. The connection mechanism includes a first connection member, a second connection member, and a drive source. The first connection member is rotatably supported by the rod and includes a first abutment surface and a first rotation axis extending in a direction substantially orthogonal to an axis of the rod. The second connection member includes a second abutment surface that comes into planar contact with the first abutment surface to form a joined surface with the first abutment surface. The drive source rotates the second connection member about a second rotation axis. A hypothetical axis is defined by an axis lying on and orthogonal to the axis of the rod and parallel to the first rotation axis. A hypothetical plane is defined by a plane set by the axis of the rod and the hypothetical axis. A referential connection state is defined by a situation in which at least a portion of the joined surface extends at a right angle relative to the hypothetical plane, a normal direction extending toward the second connection member in the first abutment surface conforms with a direction in which the rod is moved by the operational pressure of the accumulating unit, and the first rotation axis substantially conforms to the second rotation axis. The connection mechanism remains in the connected state until the second connection member is rotated by the drive source from the referential connection state by less than 90 degrees in either one of a forward direction and a reverse direction. When the second connection member is rotated by the drive source in the connected state, the first connection member is rotated with the first abutment surface in planar contact with the second abutment surface.

In the structure described above, the rod is movable toward the mold by the hydraulic pressure of the accumulating unit. However, the movement of the rod is restricted by the connection mechanism in the connected state. When movement of the rod is restricted, the rod is stands by so as to be immediately movable by the hydraulic pressure. When the connection mechanism is in the connected state, the movement of the first connection member is restricted with a simple structure in which the first abutment surface comes into planar contact with the second abutment surface. Further, when the drive source is driven to shift the connection mechanism to the disconnected state and cancel the planar contact between the first abutment surface and the second abutment surface, the rod in the standby state is moved by the hydraulic pressure. In this case, the hydraulic pressure from the accumulating unit has already been entirely acting on the rod. Thus, the rod may be immediately moved by the hydraulic pressure. This improves the response of the movement of the rod compared to, for example, when opening a valve so that hydraulic oil from the accumulating unit acts on the rod. Accordingly, in the present invention, the movement of the rod may be restricted (obtain the connected state) with a simple structure in which the first abutment surface of the first connection member comes into planar contact with the first abutment surface of the second connection member. Moreover, the planar contact may be released (shift to the disconnected state) with just one single drive source. Thus, the response of the movement of the rod in the high speed operation may be improved with a simple and inexpensive structure.

DETAILED DESCRIPTION OF THE PREFERRED EMBODIMENTS

One embodiment of the present invention will now be described with reference to FIGS. 1 to 7.

Figure 1:
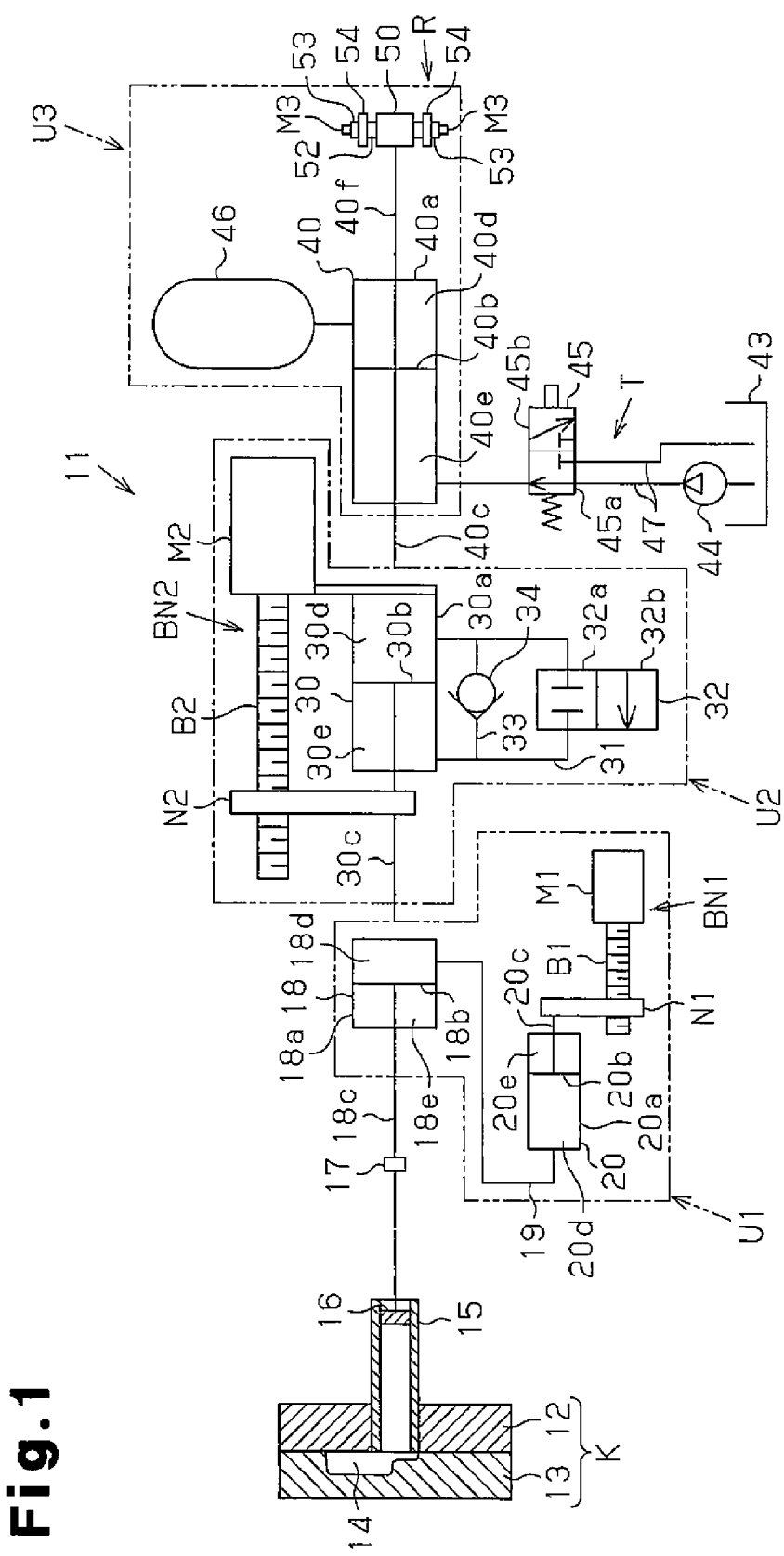
FIG. 1 is a schematic diagram of an injection apparatus according to an embodiment of the present invention.

As shown in FIG. 1, a mold K includes a fixed mold 12 and a movable mold 13. A mold fastening device (not shown) opens and closes the mold K and fastens the fixed mold 12 and the movable mold 13. The injection apparatus 11 injects and fills a metal material serving as the molding material into a cavity 14 formed in the mold K. The metal material, which is injected into the mold K, is solidified and then removed from the mold K to obtain a desired molded product.

The fixed mold 12 includes an injection sleeve 15, which is in communication with the cavity 14, and an injection plunger 16, which is arranged in the injection sleeve 15 in a movable manner. When the injection sleeve 15 is supplied with metal material through a supply port (not shown) formed in the injection sleeve 15, the injection plunger 16 is moved in the injection sleeve 15 toward the cavity 14 to inject and fill the metal material into the cavity 14.

A connection member 17 connects the injection plunger 16 to a distal end of a rod 18c of a pressurizing operation cylinder 18. In the pressurizing operation cylinder 18, a cylinder tube 18a accommodates a movable piston 18b, which is integrated with the rod 18c. The piston 18b divides the interior of the cylinder tube 18a into a rod side chamber 18e, from which the rod 18c extends, and an opposite head side chamber 18d.

The rod side chamber 18e opens to the atmosphere through a supply/discharge port (not shown) formed in the cylinder tube 18a. An amplification oil passage 19 connects the head side chamber 18d to an operation cylinder 20. The operation cylinder 20 has a smaller cylinder diameter than the pressurizing operation cylinder 18. The operation cylinder 20, which has a smaller diameter than the pressurizing operation cylinder 18, and the amplification oil passage 19, which connects the operation cylinder 20 to the pressurizing operation cylinder 18, form an amplification circuit that amplifies the thrust of the rod 18c in the pressurizing operation cylinder 18.

The operation cylinder 20 includes a cylinder tube 20a that accommodates a piston 20b. A rod 20c is formed integrally with the piston 20b. The piston 20b divides the interior of the cylinder tube 20a of the operation cylinder 20 into a rod side chamber 20e, from which the rod 20c extends, and an opposite head side chamber 20d. The amplification oil passage 19 connects the head side chamber 20d of the operation cylinder 20 and the head side chamber 18d of the pressurizing operation cylinder 18. Hydraulic oil serving as an incompressible fluid is sealed in the two head side chambers 18d and 20d.

An operation ball screw/nut mechanism BN1 that moves the rod 20c forward and rearward is connected to the rod 20c. In detail, an operation nut N1 is connected to the distal end of the rod 20c, and the operation nut N1 is fastened to an operation ball screw B1, which is rotated by an operation motor M1. The operation ball screw B1 is rotated so that the operation nut N1 moves forward or rearward in the axial direction of the operation ball screw B1. In this manner, the operation ball screw/nut mechanism BN1 includes the operation nut N1, the operation ball screw B1, and the operation motor M1.

In the present embodiment, the pressurizing operation cylinder 18, the amplification oil passage 19, the operation cylinder 20, and the operation ball screw/nut mechanism BN1 form a pressurizing operation unit U1.

In the pressurizing operation unit U1, the side opposite to the mold K is mechanically connected to a rod 30c of a low speed operation cylinder 30 in a low speed operation unit U2. The low speed operation cylinder 30 includes a cylinder tube 30a that accommodates a movable piston 30b, which is formed integrally with the rod 30c. The piston 30b divides the interior of the cylinder tube 30a into a rod side chamber 30e, from which the rod 30c extends, and an opposite head side chamber 30d.

A low speed operation ball screw/nut mechanism BN2 that moves the rod 30c forward and rearward is connected to the rod 30c. In detail, a low speed operation nut N2 is connected to the rod 30c, and the low speed operation nut N2 is fastened to a low speed operation ball screw B2. The low speed operation ball screw B2 is rotated by a low speed operation motor M2.

The low speed operation motor M2 rotates the low speed operation ball screw B2 to move the low speed operation nut N2 forward or rearward in the axial direction of the low speed operation ball screw B2. The low speed operation nut N2, the low speed operation ball screw B2, and the low speed operation motor M2 form a low speed operation ball screw/nut mechanism BN2.

The rod side chamber 30e of the low speed operation cylinder 30 is connected to one end of a low speed operation oil passage 31. The head side chamber 30d is connected to the other end of the low speed operation oil passage 31. In other words, the rod side chamber 30e and the head side chamber 30d form a closed circuit with the low speed operation oil passage 31. Further, a low speed operation electromagnetic switch valve 32 is arranged in the low speed operation oil passage 31. The low speed operation electromagnetic switch valve 32 may be switched between a first position 32a, which disconnects the head side chamber 30d and the rod side chamber 30e, and a second position 32b, which allows hydraulic oil to flow between the head side chamber 30d and the rod side chamber 30e.

The low speed operation oil passage 31 includes a bypass oil passage 33 that bypasses the low speed operation electromagnetic switch valve 32. A check valve 34 is arranged in the bypass oil passage 33. When the low speed operation electromagnetic switch valve 32 is at the first position 32a, the check valve 34 inhibits the flow of hydraulic oil from the head side chamber 30d to the rod side chamber 30e and permits the flow of hydraulic oil from the rod side chamber 30e to the head side chamber 30d.

When the low speed operation electromagnetic switch valve 32 is at the first position 32a, even if back pressure force from the mold K acts on the rod 30c such that the rod 30c pushes the piston 30b toward the head side chamber 30d, the discharge of hydraulic oil from the head side chamber 30d to the rod side chamber 30e is inhibited by the check valve 34, and the back pressure force is received by the hydraulic oil. In the present embodiment, the low speed operation unit U2 is formed by the low speed operation cylinder 30, the low speed operation ball screw/nut mechanism BN2, and a back pressure receiving portion.

In the low speed operation unit U2, the side opposite to the pressurizing operation unit U1 is mechanically connected to a first rod 40c of a high speed operation cylinder 40 in a high speed operation unit U3. The high speed operation cylinder 40 is a double rod cylinder and includes a cylinder tube 40a, which accommodates a movable piston 40b formed integrally with the first rod 40c, and a second rod 40f is formed integrally with the side of the first rod 40c opposite to the piston 40b. The piston 40b divides the interior of the cylinder tube 40a into a first chamber 40e, serving as an operation chamber at the side of the first rod 40c, and a second chamber 40d, serving as an operation chamber at the opposite side from which the second rod 40f extends.

A supply/discharge mechanism T is connected to the first chamber 40e. The supply/discharge mechanism T supplies hydraulic oil to the first chamber 40e and discharges hydraulic oil from the first chamber 40e. The supply/discharge mechanism T includes an oil tank 43, a pump 44 that draws hydraulic oil from the oil tank 43, and an electromagnetic switch valve 45 arranged in a supply/discharge oil passage 47. The electromagnetic switch valve 45 may be switched to a first position 45a, at which the electromagnetic switch valve 45 supplies the hydraulic oil drawn from the oil tank 43 by the pump 44 to the first chamber 40e, and a second position 45b, at which the electromagnetic switch valve 45 discharges the hydraulic oil from the first chamber 40e into the oil tank 43. An accumulator 46 serving as an accumulating unit is connected to the second chamber 40d of the high speed operation cylinder 40. Hydraulic oil is accumulated in the accumulator 46. The hydraulic oil from the accumulator 46 is supplied to the second chamber 40d. Hydraulic pressure (operational pressure) directed toward the low speed operation unit U2 acts on the piston 40b, and the hydraulic pressure moves the first rod 40c and the second rod 40f toward the low speed operation unit U2. The hydraulic pressure and the flow rate acting on the piston 40b are adjusted to realize the desired injection speed in the high speed operation.

A connection mechanism R arranged in the high speed operation cylinder 40 will now be described.

Figure 3A:
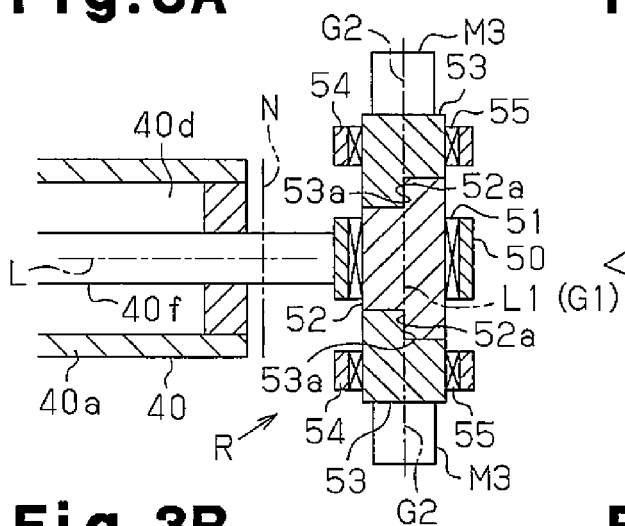
FIG. 3A is a cross-sectional view showing a connection mechanism of FIG. 1 in a connected state.
Figure 3C:
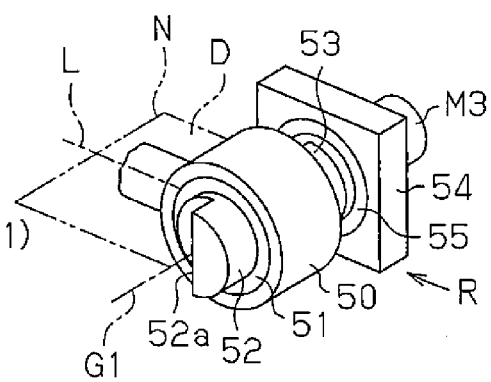
FIG. 3C is a perspective view showing a first connection member of FIG. 3A.
Figure 3B:
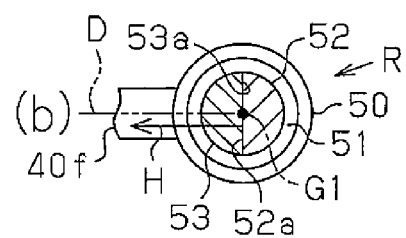
FIG. 3B is a cross-sectional view showing a first abutment surface and a second abutment surface in the connected state.

As shown in FIGS. 3A to 3C, a cylindrical first support member 50 is fixed to the distal end of the second rod 40f of the high speed operation cylinder 40. The first support member 50 is fixed to the second rod 40f so that its axis L1 extends in the radial direction of the second rod 40f (orthogonal to the axis L of the second rod 40f). The inner circumferential surface of the first support member 50 supports a first bearing 51, which rotatably supports a first connection member 52. The first connection member 52 is formed from a rod to have a predetermined shape, and is supported by the first bearing 51 to rotate about the axis of the first connection member 52 that serves as a first rotation axis G1. The first rotation axis G1 extends at a substantially right angle relative to the axis L of the second rod 40f. Here, to be a substantially right angle, the first rotation axis G1 only needs to be rotatable relative to the second rod 40f and does not have to be a perfect right angle.

The two sides of the first connection member 52 in the direction in which the first rotation axis G1 extends (hereinafter referred to as axial direction), that is, the two sides of which reference is the second rod 40f are semi-cylindrical, and a planar portion extending in the radial direction of the first connection member 52 defines a first abutment surface 52a. A line that lies on the axis L of the second rod 40f and is orthogonal to the axis L and parallel to the first rotation axis G1 is referred to as a hypothetical axis N. As shown in FIG. 3C, a plane lying on the hypothetical axis N and the axis L is referred to as a hypothetical plane D. When the first connection member 52 is rotated, the angle of the first abutment surface 52a changes relative to the hypothetical plane D. In FIGS. 3A to 3C, the first abutment surface 52a is arranged at a right angle relative to the hypothetical plane D.

Figure 3D:
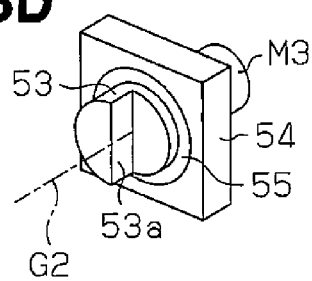
FIG. 3D is a perspective view showing a second connection member of FIG. 3A.

As shown in FIGS. 3A and 3D, a second connection member 53 is arranged on each of two axial outer sides of the first connection member 52. A second support member 54 rotatably supports the second connection member 53 with a second bearing 55. The second connection member 53 is formed from a rod to have a predetermined shape and is supported by the second bearing 55 so as to rotate about the axis of the second connection member 53 serving as a second rotation axis G2. The second connection member 53 is rotated by a motor M3 serving as a drive source.

The second connection member 53 at the side of the first connection member 52 is formed to be semi-cylindrical and includes a planar portion extending in the radial direction of the second connection member 53 that defines a second abutment surface 53a. The second abutment surface 53a has the same shape as the first abutment surface 52a of the first connection member 52 and may be in planar contact with the first abutment surface 52a. When the second connection member 53 is rotated, the angle of the second abutment surface 53a changes relative to the hypothetical plane D. As shown in FIG. 3B, the second abutment surface 53a and the first abutment surface 52a of the first connection member 52 are in abutment thus forming a joined surface when the angle of the second abutment surface 53a relative to the hypothetical plane D is within a predetermined angle range.

As shown in FIGS. 3A and 3B, when the first abutment surface 52a and the second abutment surface 53a are in abutment and thus form the joined surface and the portion forming the semi-cylindrical form of the second connection member 53 is arranged closer to the accumulator 46 than the portion forming the semi-cylindrical form of the first connection member 52, the second connection member 53 restricts movement of the first connection member 52 toward the accumulator 46. In detail, movement of the first connection member 52 and the second connection member 53 toward the accumulator 46 is restricted when in a referential connection state. Accordingly, in the referential connection state, movement of the second rod 40f is restricted even if the hydraulic pressure from the accumulator 46 is acting on the piston 40b. When movement of the second rod 40f is restricted, the second rod 40f stands by so as to be immediately movable by the hydraulic pressure from the accumulator 46.

The referential connection state is a state in which at least a portion of the joined surface of the abutment surfaces 52a and 53a intersects the hypothetical plane D at a right angle, and a normal direction H extending toward the second abutment surface 53a in the first abutment surface 52a conforms with the direction in which the second rod 40f is moved by the hydraulic pressure from the accumulator 46. In this state, the first and second rotation axes G1 and G2 are substantially coaxial. Here, to be substantially coaxial, the first and second rotation axes G1 and G2 only need to be in a relationship in which the rotation of the second connection member 53 rotates the first connection member 52 and does not have to be perfectly coaxial.

In the connection mechanism R, when the second connection member 53 is rotated by less than 90 degrees in both directions from the referential connection state by the motor M3, the first abutment surface 52a and the second abutment surface 53a remain in abutment, and movement of the first connection member 52 toward the accumulator 46 is restricted. Thus, the first connection member 52 and the second connection member 53 are in the connected state from the referential connection state to where they are rotated by less than 90 degrees in both forward and reverse directions.

As shown in FIG. 6, in the connection mechanism R, when the motor M3 rotates the second connection member 53 by 90 degrees, the second abutment surface 53a rotates the first connection member 52 by 90 degrees. Consequently, the second connection member 53 is no longer located in the direction in which the first connection member 52 and the second rod 40f are moved by the hydraulic pressure of the accumulator 46. Accordingly, the first connection member 52 is movable toward the accumulator 46 with the second rod 40f, and the connected state is cancelled. Thus, in the present embodiment, the high speed operation unit U3 is formed by the connection mechanism R, the high speed operation cylinder 40, the supply/discharge mechanism T, and the accumulator 46.

In the present embodiment, the rod 18c of the pressurizing operation unit U1 is mechanically connected to the mold K, and the rod 30c of the low speed operation unit U2 is mechanically connected to the pressurizing operation unit U1. Further, the rod 40c of the high speed operation unit U3 is mechanically connected to the low speed operation unit U2. The rods 18c, 30c, and 40c are arranged along the same axis, and the pressurizing operation cylinder 18, the low speed operation cylinder 30, and the high speed operation cylinder 40 are arranged in series.

The operation pattern (ejection pattern) when the injection apparatus 11 performs injection will now be described with reference to FIG. 2.

The injection apparatus 11 performs three operations, the low speed operation, the high speed operation, and the pressurizing operation. The low speed operation is performed in the initial stage of injection and operates the injection plunger 16 in the low speed operation unit U2 when extruding metal material from the injection sleeve 15 to the cavity 14.

The high speed operation follows the low speed operation and operates the injection plunger 16 at a higher speed than the low speed operation. The high speed operation operates the injection plunger 16 in the high speed operation unit U3.

The pressurizing operation, which follows the high speed operation and which is the final stage of injection performed, pressurizes the metal material in the cavity 14 with the force generated when the injection plunger 16 moves forward and toward the mold K. The pressurizing operation operates the injection plunger 16 in the pressurizing operation unit U1.

Figure 2:
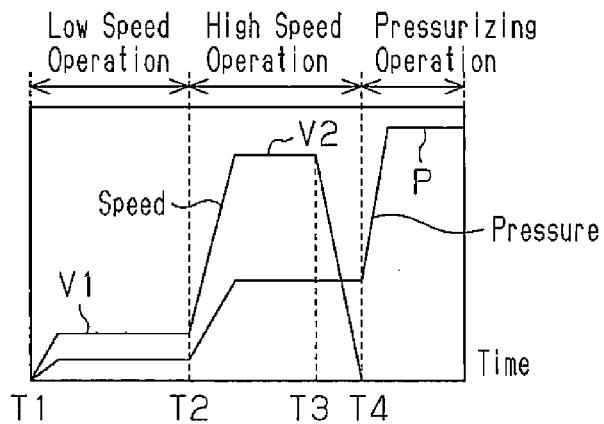
FIG. 2 is a graph showing changes in the injection pressure and the injection speed of the injection apparatus of FIG. 1.

In each of these operations, the injection apparatus 11 is operated in different patterns, as shown in FIG. 2. More specifically, in the high speed operation, the injection plunger 16 needs to be operated at a higher speed than the low speed operation. However, speed is not necessary in the pressurizing operation. Further, the injection plunger 16 needs to be operated to apply a higher pressure than the low speed operation and the high speed operation in the pressurizing operation but does not have to be operated to apply as much pressure as the pressurizing operation in the low speed operation and the high speed operation.

The operation of the injection apparatus 11 in the present embodiment will now be described.

Figure 4:
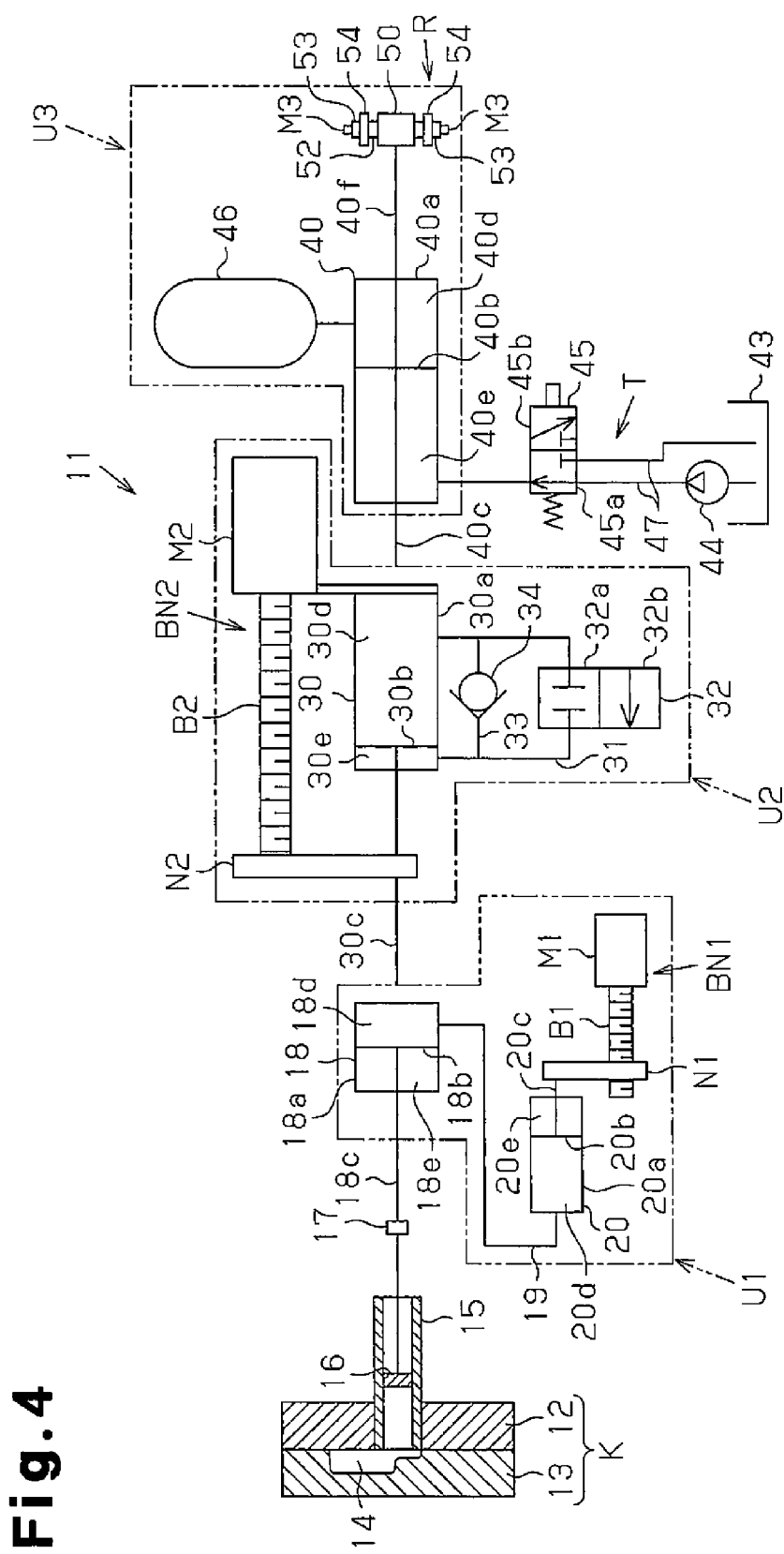
FIG. 4 is a schematic view showing the injection apparatus of FIG. 1 during a low speed operation.

First, the low speed operation will be described with reference to FIGS. 1 and 4.

Before starting the low speed operation, the injection plunger 16 of the injection sleeve 15, the rod 18c of the pressurizing operation cylinder 18, the rod 20c of the operation cylinder 20, the rod 30c of the low speed operation cylinder 30, and the two rods 40c and 40f of the high speed operation cylinder 40 are located at predetermined initial positions as shown in FIG. 1. The rods 18c, 20c, 30c, 40c, and 40f located at the initial positions do not apply injection pressure to the metal material supplied to the injection sleeve 15 (time T1 in FIG. 2).

The low speed operation electromagnetic switch valve 32 of the low speed operation unit U2 is switched to the first position 32a during molding to disconnect the rod side chamber 30e and the head side chamber 30d. Further, the electromagnetic switch valve 45 of the supply/discharge mechanism T of the high speed operation unit U3 is switched to the first position 45a so that the hydraulic oil of the first chamber 40e in the high speed operation cylinder 40 does not return to the oil tank 43.

After completing molding preparations such as the fastening of the fixed mold 12 and the movable mold 13 and the supply of metal material to the injection sleeve 15, the low speed operation unit U2 starts the low speed operation. In the low speed operation, the rod 30c of the low speed operation cylinder 30 has the injection velocity V1 shown in FIG. 2. The low speed operation motor M2 is driven to rotate the low speed operation ball screw B2 and move forward the low speed operation nut N2, which is fastened to the low speed operation ball screw B2. As a result, referring to FIG. 4, the low speed operation nut N2 applies drive force to the rod 30c of the low speed operation cylinder 30 and moves the rod 30c forward. The forward movement of the rod 30c entirely pushes the pressurizing operation unit U1 toward the mold K.

When the pressurizing operation unit U1 moves forward, the pressurizing operation cylinder 18 moves forward. The injection plunger 16, which is connected to the rod 18c of the pressurizing operation cylinder 18, is also moved forward. The forward movement of the injection plunger 16 injects the metal material from the injection sleeve 15 to the cavity 14.

When the rod 30c of the low speed operation cylinder 30 reaches a terminal position in the low speed operation (time T2 of FIG. 2), the low speed operation is shifted to the high speed operation.

The high speed operation will now be described with reference to FIGS. 5 and 6.

In the high speed operation, the injection plunger 16 accumulates the hydraulic oil in the accumulator 46 and drives the motor M3 at a predetermined timing to rotate the second connection member 53 by 90 degrees and obtain the injection velocity V2 shown in FIG. 2. Here, the electromagnetic switch valve 45 needs to be switched to the second position 45b.

Figure 6A:
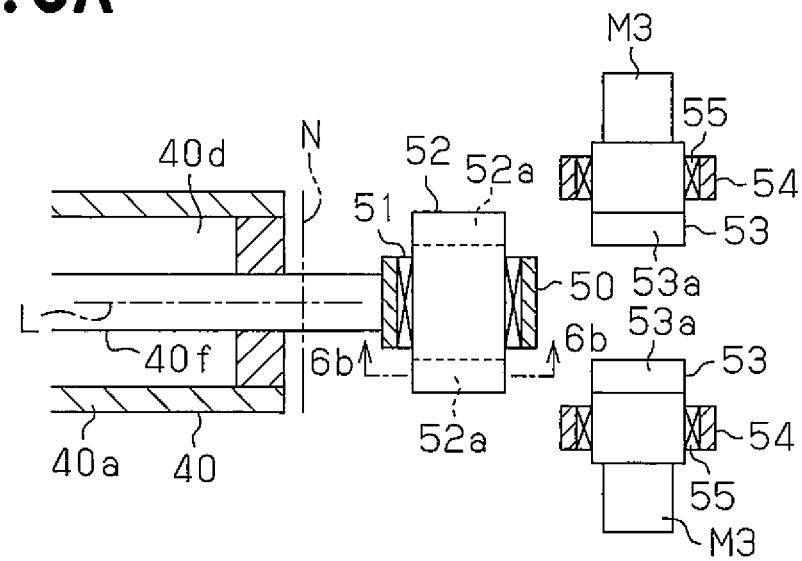
FIG. 6A is a view showing the connection mechanism of FIG. 1 in a disconnected state.
Figure 6B:
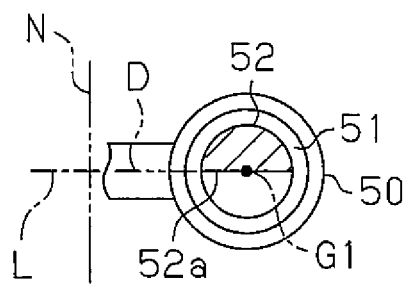
FIG. 6B is a cross-sectional view taken along line 6b-6b in FIG. 6A showing the first connection member in the disconnected state.
Figure 6C:
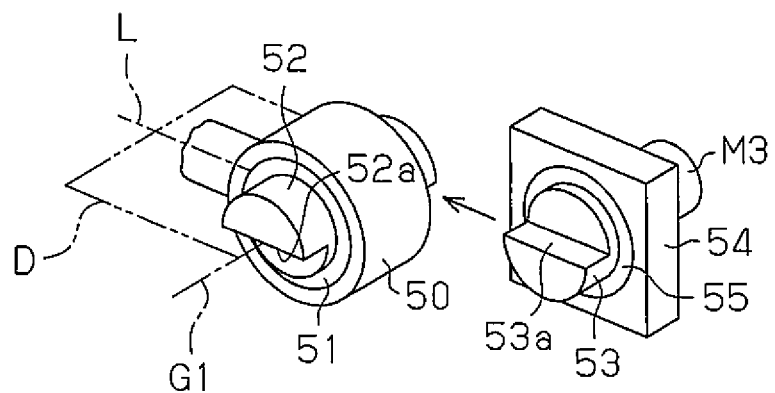
FIG. 6C is a view showing the first connection member and the second connection member of FIG. 6A in the disconnected state.

Then, as shown in FIG. 6A, the rotation of the second connection member 53 rotates the first connection member 52 by 90 degrees with the second abutment surface 53a. As shown in FIGS. 6B and 6C, when the joined surface of the first abutment surface 52a and the second abutment surface 53a is located on the hypothetical plane D and extends in the horizontal direction, the movement restriction of the first connection member 52 imposed by the second connection member 53 is cancelled. That is, the connection state of the first connection member 52 and the second connection member 53 is cancelled (disconnected state). Then, the piston 40b, to which the hydraulic pressure from the accumulator 46 acts and which is in a standby state to be immediately movable, is immediately moved toward the first chamber 40e by the hydraulic pressure. Further, hydraulic oil is discharged from the first chamber 40e to the oil tank 43 through the electromagnetic switch valve 45. As a result, the piston 40b of the high speed operation cylinder 40 is moved forward at a high speed toward the first chamber 40e, and the first rod 40c is also moved forward at a high speed. Then, the first rod 40c pushes and moves forward the pressurizing operation unit U1 toward the mold K with the low speed operation unit U2 by the first rod 40c.

Figure 5:
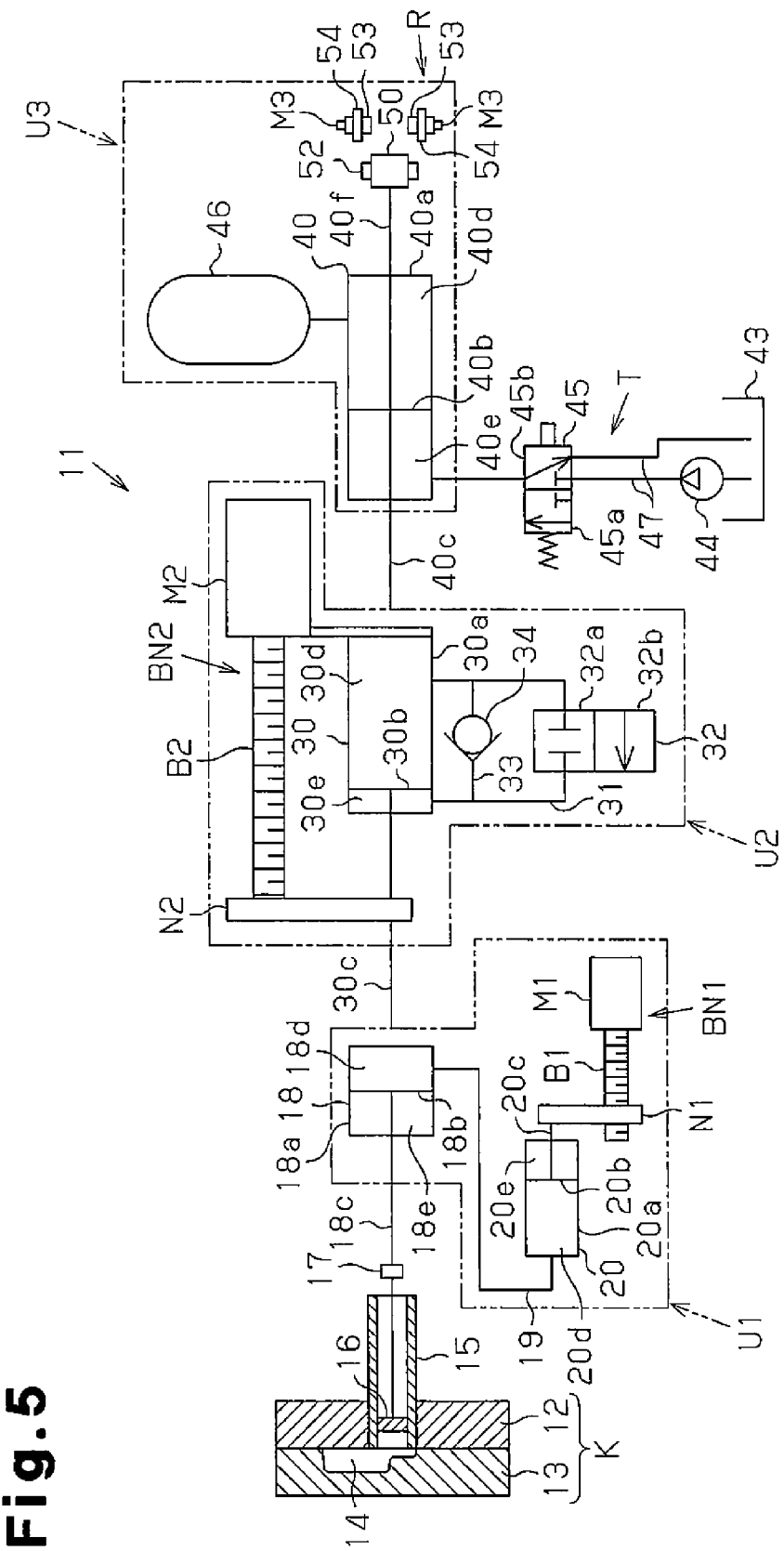
FIG. 5 is a schematic view showing the injection apparatus of FIG. 1 during a high speed operation.

As shown in FIG. 5, when the low speed operation unit U2 moves the pressurizing operation unit U1 forward at the injection speed V2, the pressurizing operation cylinder 18 moves forward. This moves forward the injection plunger 16, which is connected to the rod 18c of the pressurizing operation cylinder 18, at the injection speed V2 and injects the metal material from the injection sleeve 15 into the cavity 14. During the high speed operation, the pressurizing operation unit U1 and the low speed operation unit U2 are operated at higher speeds compared to the low speed operation.

During the high speed operation, the pressurizing operation unit U1 applies back pressure force from the mold K to the low speed operation cylinder 30 of the low speed operation unit U2. However, in the low speed operation cylinder 30, the check valve 34 inhibits the flow of the hydraulic oil from the head side chamber 30d to the rod side chamber 30e. This inhibits the rearward movement of the rod 30c toward the head side chamber 30d caused by the back pressure force. As a result, rotation is inhibited in the low speed operation ball screw B2 caused by the low speed operation nut N2, which is fastened to the rod 30c, and the low speed operation motor M2.

Figure 7:
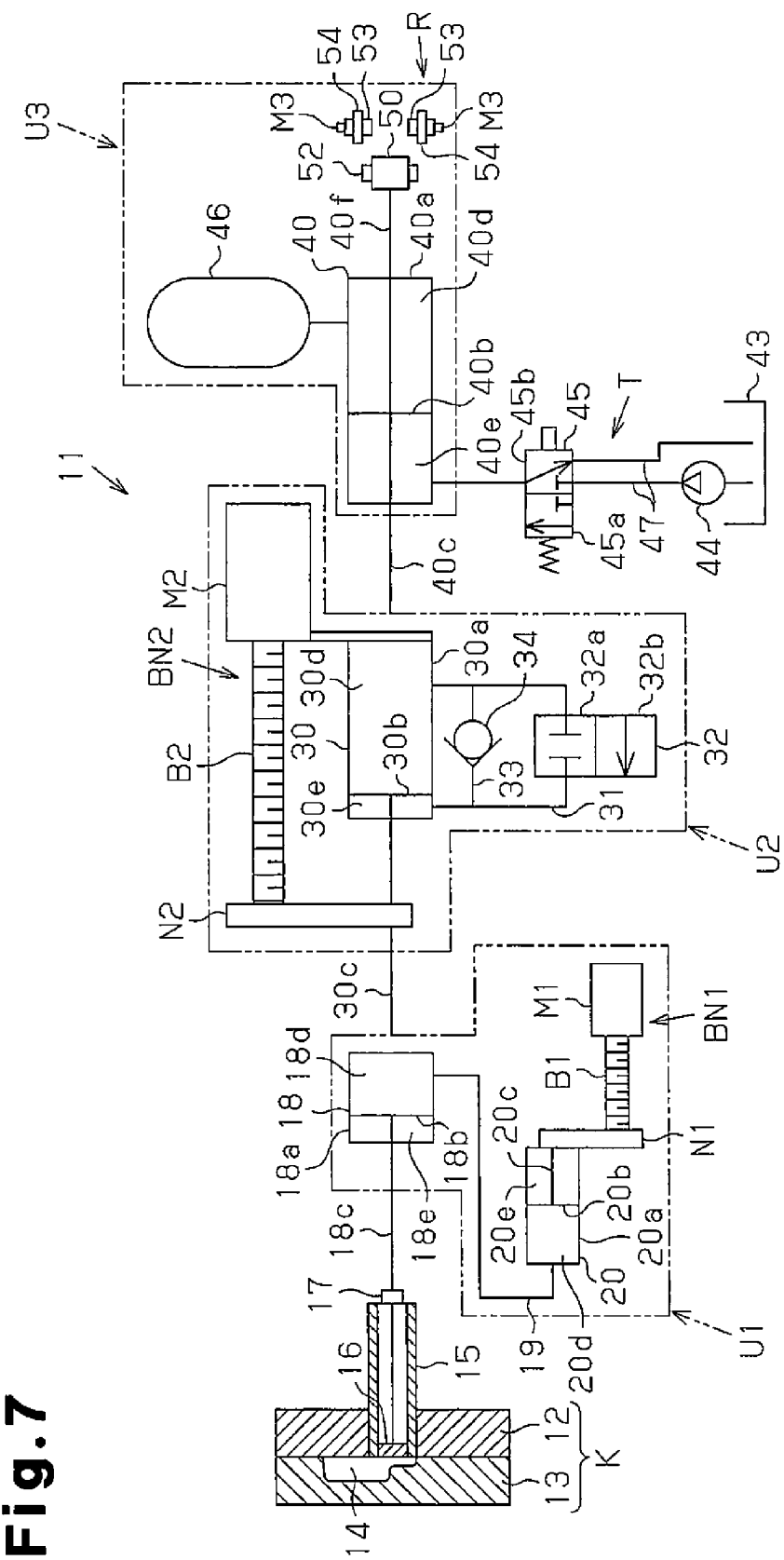
FIG. 7 is a schematic view showing the injection apparatus of FIG. 1 during pressurizing operation.
Figure 8:
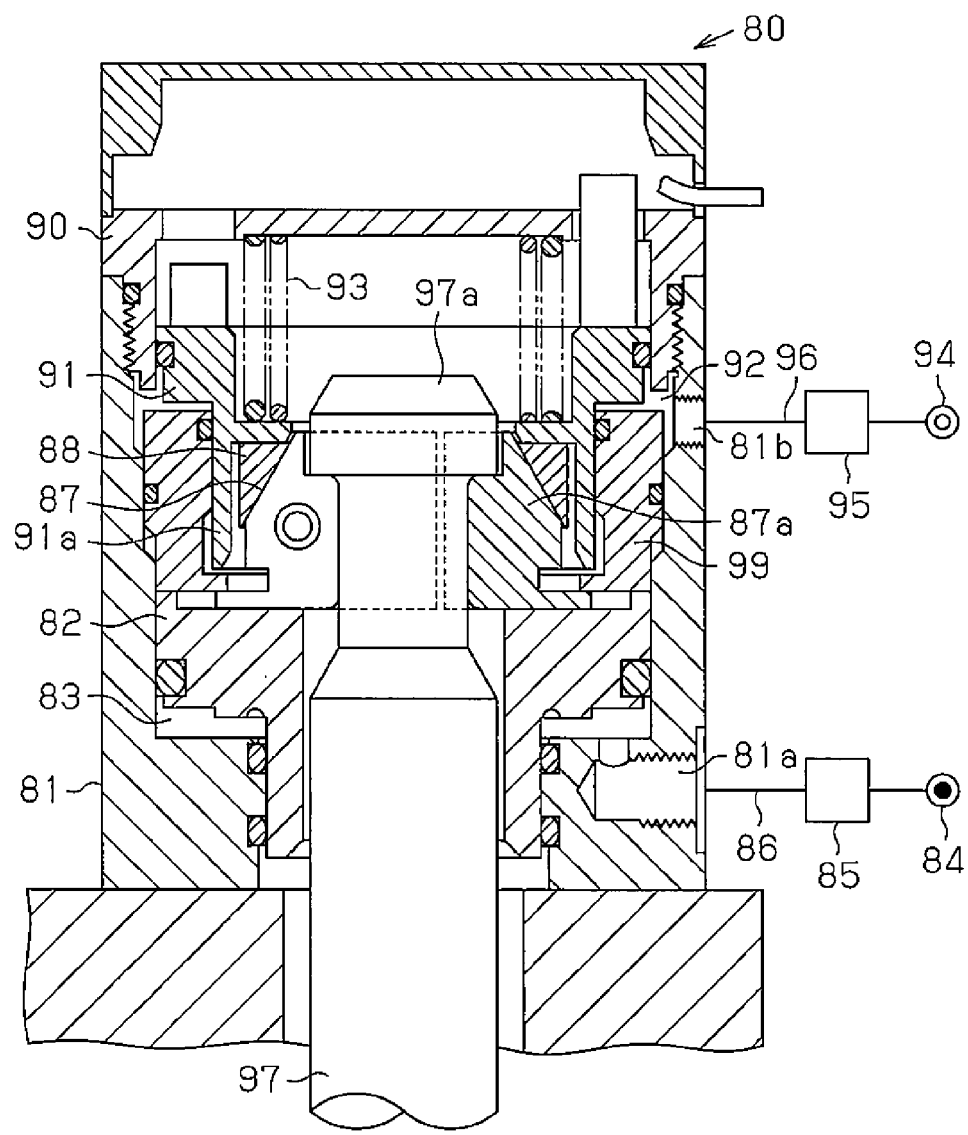
FIG. 8 is a diagram showing the prior art.

The pressurizing operation will now be described with reference to FIG. 7.

In the pressurizing operation, the pressure applied by the rod 18c of the pressurizing operation cylinder 18 produces the injection pressure P shown in FIG. 2. The rotation produced by the operation motor M1 moves forward the operation nut N1, which is fastened to the operation ball screw B1, and the operation nut N1 applies drive force that moves the rod 20c of the operation cylinder 20 forward.

When the rod 20c of the operation cylinder 20 moves forward, the hydraulic oil of the head side chamber 20d is supplied to the head side chamber 18d of the pressurizing operation cylinder 18 through the amplification oil passage 19. In the present embodiment, when the hydraulic oil is supplied from the operation cylinder 20 to the head side chamber 18d of the pressurizing operation cylinder 18, the pressure in the head side chamber 18d increases, and the pressure received by the injection plunger 16 from the pressurizing operation cylinder 18 increases in accordance with the Pascal's principle. As a result, the force of the injection plunger 16 that pressurizes the metal material in the cavity 14 increases.

During the pressurizing operation, the back pressure force from the mold K also acts on the low speed operation cylinder 30 of the low speed operation unit U2 through the pressurizing operation unit U1. However, in the low speed operation cylinder 30, the flow of hydraulic oil from the head side chamber 30d to the rod side chamber 30e is inhibited by the check valve 34. Thus, the back pressure does not move the rod 30c rearward toward the head side chamber 30d. This inhibits the rotation of the low speed operation ball screw B2 and the low speed operation motor M2 through the low speed operation nut N2 fastened to the rod 30c.

Then, when the metal material in the cavity 14 is solidified, the operation motor M1 produces rotation in a direction reversed from the pressurizing operation. The operation motor M1 moves the operation nut N1, which is fastened to the operation ball screw B1, rearward. This applies drive force to the rod 20c of the operation cylinder 20 with the operation nut N1. When the rod 20c of the operation cylinder 20 moves rearward, hydraulic oil is drawn from the head side chamber 18d of the pressurizing operation cylinder 18 into the head side chamber 20d of the operation cylinder 20 through the amplification oil passage 19. This moves the rod 18c of the pressurizing operation cylinder 18 rearward. As a result, the injection plunger 16 moves rearward in the injection sleeve 15.

Subsequently, the low speed operation electromagnetic switch valve 32 in the low speed operation unit U2 is switched to the second position 32b to allow the flow of hydraulic oil from the head side chamber 30d to the rod side chamber 30e. The low speed operation motor M2 produces rotation reversed from the low speed operation. The low speed operation motor M2 moves the low speed operation nut N2, which is fastened to the low speed operation ball screw B2, rearward. This applies drive force to the rod 30c of the low speed operation cylinder 30 with the low speed operation nut N2. When the rod 30c of the low speed operation cylinder 30 moves rearward, hydraulic oil is drawn from the head side chamber 30d of the low speed operation cylinder 30 into the rod side chamber 30e through the low speed operation oil passage 31 and the low speed operation electromagnetic switch valve 32. As a result, the rod 30c moves rearward, and the pressurizing operation unit U1, to which the rod 30c is connected, moves rearward. This move the injection plunger 16 rearward in the injection sleeve 15.

Then, in the high speed operation unit U3, the electromagnetic switch valve 45 is controlled and switched to the first position 45a. The pump 44 is driven to supply hydraulic oil from the oil tank 43 to the first chamber 40e. The piston 40b is then moved rearward toward the second chamber 40d, and the hydraulic oil of the second chamber 40d is accumulated in the accumulator 46. At the same time, the piston 40b moves rearward. This moves the first rod 40c and the second rod 40f rearward by applying drive force and moves the low speed operation unit U2, to which the first rod 40c is connected, rearward. The pressurizing operation unit U1, to which the rod 30c of the low speed operation unit U2 is connected, is also moved rearward. As a result, the injection plunger 16 moves rearward in the injection sleeve 15.

When the second rod 40f moves rearward and the first abutment surface 52a of the first connection member 52 is in planar contact with the second abutment surface 53a of the second connection member 53 thus forming the joined surface, the motor M3 produces a 90-degrees rotation so that the first connection member 52 and the second connection member 53 shift to the referential connection state. This restricts forward movement of the piston 40b.

Accordingly, the injection plunger 16 of the injection sleeve 15, the rod 18c of the pressurizing operation cylinder 18, the rod 20c of the operation cylinder 20, the rod 30c of the low speed operation cylinder 30, and the two rods 40c and 40f of the high speed operation cylinder 40 are located at the initial positions shown in FIG. 1. Then, the fixed mold 12 and the movable mold 13 are separated to remove the molded product from the mold.

The embodiment described above has the following advantages.

(1) When the motor M3 is driven to rotate the second connection member 53 and shift the connection mechanism R to the disconnected state, the planar contact (mechanical connection) of the first abutment surface 52a and the second abutment surface 53a is cancelled. This allows the second rod 40f to be moved by the hydraulic pressure. Under this situation, the hydraulic pressure from the accumulator 46 entirely acts on the piston 40b. Thus, the hydraulic pressure immediately moves the second rod 40f. This improves the response of the movement of the second rod 40f compared to when opening a valve so that the hydraulic oil from the accumulator 46 acts on the piston 40b. Thus, the use of the connection mechanism R enabling mechanical connection and disconnection of the second rod 40f improves the response of the movement of the second rod 40f in the high speed operation with a simple and inexpensive structure.

(2) The accumulator 46 is connected to the second chamber 40d of the high speed operation cylinder 40, and the hydraulic pressure from the accumulator 46 entirely acts on the piston 40b so that the second rod 40f is in a standby state and immediately movable toward the mold K. Further, the connection mechanism R is in the connected state to restrict movement of the second rod 40f. When the connection mechanism R is in the connected state, the first abutment surface 52a of the first connection member 52 and the second abutment surface 53a of the second connection member 53 are in planar contact to restrict movement of the first connection member 52 and thereby restrict movement of the second rod 40f. Accordingly, there is no need for a complicated structure including a hydraulic circuit and a pneumatic circuit, and the movement of the second rod 40f is restricted with a simple structure in which the first abutment surface 52a and the second abutment surface 53a come into planar contact.

(3) The first abutment surface 52a and the second abutment surface 53a are each flat. Thus, compared to when, for example, the first abutment surface 52a and the second abutment surface 53a engage each other using a recess and a projection in the connected state, the first abutment surface 52a and the second abutment surface 53a come into planar contact and shift to the connected state more easily.

(4) The first rotation axis G1 of the first connection member 52 is located on the axis L of the second rod 40f. For example, when the first rotation axis G1 of the first connection member 52 is separated from the axis L of the second rod 40f and the first connection member 52 is supported beside the second rod 40f, the second rod 40f tends to move in the direction in which the hydraulic pressure acts in the connected state. Thus, forces act in opposite directions on an axis that differs from that of the second rod 40f and the first connection member 52. This may damage the portion connecting the second rod 40f and the first connection member 52. However, by arranging the first rotation axis G1 on the axis L of the second rod 40f, the first connection member 52 is supported on the axis L of the second rod 40f, and forces act in opposite directions on the same line in a connected portion. Thus, the connected portion is not easily damaged.

(5) The first abutment surfaces 52a of the first connection member 52 is arranged on both sides of the first connection member 52 using the axis L of the second rod 40f as a reference. Thus, the first abutment surfaces 52a come into planar contact at two locations. Compared to when the planar contact occurs at only one location, the area of contact may be increased between the first abutment surfaces 52a and the second abutment surfaces 53a. This stabilizes the connected state stably restricts movement of the second rod 40f. Further, since there are two locations of planar contact, the first connection member 52 is supported at two portions by the two second connection members 53. This prevents tilting of the first connection member 52 and tilting of the second rod 40f.

(6) The first connection member 52 includes the first abutment surfaces 52a formed on two sides of a cylindrical member. The second connection member 53 includes the second abutment surface 53a formed on one side of a cylindrical member. Thus, the abutment surfaces 52a and 53a are easily formed on cylindrical members. This reduces manufacturing costs of the first connection member 52 and the second connection member 53.

The embodiment described above may be modified as follows.

At least one of the first connection member 52 and the second connection member 53 may not be a non-cylindrical member as long as it is rotatable.

The first abutment surface 52a may be formed by fixing a discrete member to the first connection member 52, and the second abutment surface 53a may be formed by fixing a discrete member to the second connection member 53.

In the first connection member 52, the first abutment surface 52a may be formed only on one side in the axial direction (radial direction of the second rod 40f). In this case, only one second connection member 53 is arranged at a location corresponding to the first abutment surface 52a.

In the embodiment, the first connection member 52 is arranged in the second rod 40f so that the first rotation axis G1 of the first connection member 52 is located on the axis L of the second rod 40f. However, the first connection member 52 may be arranged in the second rod 40f so that the first rotation axis G1 is separated from the axis L of the second rod 40f.

In the embodiment, the first abutment surface 52a and the second abutment surface 53a are each flat. However, for example, the first abutment surface 52a may be formed to be a projection and the second abutment surface 53a may be formed to be a recess that is engaged with the first abutment surface 52a can engage. Alternatively, the first abutment surface 52a may be formed to be outwardly curved, and the second abutment surface 53a may be formed to be inwardly curved. In this manner, the shapes of the first abutment surface 52a and the second abutment surface 53a may be changed as long as planar contact is possible.

The injection apparatus 11 may be applied to an injection apparatus that injects a resin material into the cavity 14 to manufacture a resin molded product.

The invention claimed is:

1. An injection apparatus that performs a low speed operation, a high speed operation, and a pressurizing operation to inject and fill a molding material into a mold, the injection apparatus comprising:
a high speed operation cylinder operated during the high speed operation and including a rod and an operation chamber;
an accumulating unit connected to the operation chamber to supply operational pressure to the operation chamber and move the rod; and
a connection mechanism switchable between a connected state, in which the connection mechanism restricts movement of the rod caused by the operational pressure of the accumulating unit, and a disconnected state, in which the connection mechanism cancels the connected state so that the rod is movable by the operational pressure, wherein the connection mechanism includes a first connection member, a second connection member, and a drive source, wherein
the first connection member is rotatably supported by the rod and includes a first abutment surface and a first rotation axis extending in a direction substantially orthogonal to an axis of the rod,
the second connection member includes a second abutment surface that comes into planar contact with the first abutment surface to form a joined surface with the first abutment surface,
the drive source rotates the second connection member about a second rotation axis,
a hypothetical axis is defined by an axis lying on and orthogonal to the axis of the rod and parallel to the first rotation axis, and
a hypothetical plane is defined by a plane set by the axis of the rod and the hypothetical axis,
a referential connection state is defined by a situation in which at least a portion of the joined surface extends at a right angle relative to the hypothetical plane, a normal direction extending toward the second connection member in the first abutment surface conforms with a direction in which the rod is moved by the operational pressure of the accumulating unit, and the first rotation axis substantially conforms to the second rotation axis,
the connection mechanism remains in the connected state until the second connection member is rotated by the drive source from the referential connection state by less than 90 degrees in either one of a forward direction and a reverse direction, and
when the second connection member is rotated by the drive source in the connected state, the first connection member is rotated with the first abutment surface in planar contact with the second abutment surface.

2. The injection apparatus according to claim 1, wherein the first abutment surface and the second abutment surface are both flat surfaces.

3. The injection apparatus according to claim 1, wherein the first rotation axis of the first connection member conforms to the axis of the rod.

4. The injection apparatus according to claim 1, wherein the first abutment surface is one of two first abutment surfaces formed on two sides of the first connection member with respect to the axis of the rod as being a reference.

5. The injection apparatus according to claim 1, wherein each of the first connection member and the second connection member is formed by a cylindrical member including a corresponding abutment surface.

* * * * *